(12) United States Patent
Xiong et al.

(10) Patent No.: US 9,483,780 B2
(45) Date of Patent: Nov. 1, 2016

(54) PROVIDING CONTENT USING INTEGRATED OBJECTS

(71) Applicant: Google Inc., Mountain View, CA (US)

(72) Inventors: Yan Xiong, Mountain View, CA (US); Yufan Zhu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 14/227,791

(22) Filed: Mar. 27, 2014

(65) Prior Publication Data

US 2015/0278876 A1   Oct. 1, 2015

(51) Int. Cl.
*G06Q 30/00* (2012.01)
*G06Q 30/02* (2012.01)

(52) U.S. Cl.
CPC ...... *G06Q 30/0275* (2013.01); *G06Q 30/0277* (2013.01)

(58) Field of Classification Search
CPC .................................................. G06Q 30/0275
See application file for complete search history.

(56) References Cited

U.S. PATENT DOCUMENTS

| | | | |
|---|---|---|---|
| 8,275,659 | B2 | 9/2012 | Ellis et al. |
| 8,328,640 | B2 | 12/2012 | Rom et al. |
| 2002/0138617 | A1 | 9/2002 | Christfort et al. |
| 2006/0212350 | A1* | 9/2006 | Ellis ........................ G06Q 30/02 705/14.41 |
| 2012/0130819 | A1* | 5/2012 | Willcock .......... G06F 17/30867 705/14.66 |
| 2012/0233589 | A1 | 9/2012 | Mruthyunjaya et al. |
| 2012/0278185 | A1* | 11/2012 | Ramachandran ...... G06Q 30/02 705/14.73 |

* cited by examiner

*Primary Examiner* — Bennett Sigmond
*Assistant Examiner* — Scott C Anderson
(74) *Attorney, Agent, or Firm* — Foley & Lardner LLP; John D. Lanza

(57) ABSTRACT

A real-time bidding system receives a notification of an available impression from an impression notification object integrated with an application executing on a client device. The real-time bidding system auctions the available impression to multiple different bidders and receives a bid response from each of the multiple different bidders. The real-time bidding system identifies a winning bid response, identifies a content requestor object indicated by the winning bid response, and generates instructions for the client device. The instructions cause the client device to use the content requestor object indicated by the winning bid response to request a third-party content item. The real-time bidding system provides the generated instructions to the client device in response to the notification of the available impression.

18 Claims, 4 Drawing Sheets

PROVIDING CONTENT USING INTEGRATED OBJECTS

BACKGROUND

The Internet provides access to a wide variety of content. First-party content providers such as publishers, website operators, and application developers can monetize their first-party content by allowing sponsored third-party content (e.g., advertisements) to be integrated therewith. For example, application developers may bundle or combine a content requestor object with an application developed for a client device by inserting the content requestor object into the code of the application prior to compilation (e.g., using a software development kit) or by providing the content requestor object as a separate application.

Content requestor objects may be configured to request third-party content items from a demand side platform (DSP) such as a third-party content server or content selection service when executed by the client device. The DSP then auctions the opportunity for presenting a third-party content item on the client device to a set of third-party content providers associated with the DSP. Each content requestor object may be configured to request third-party content items from a single DSP associated with a limited set of third-party content providers.

SUMMARY

One implementation of the present disclosure is a multi-stage method for providing third-party content to a client device using integrated objects. The method includes receiving, at a real-time bidding system, a notification of an available impression for presenting third-party content on the client device from an impression notification object integrated with an application executing on the client device, auctioning the available impression to multiple different bidders, and receiving a bid response from each of the multiple different bidders. Each bid response includes an indication of a content requestor object. The method further includes identifying a winning bid response and a content requestor object indicated by the winning bid response and generating instructions for the client device. The instructions cause the client device to use the content requestor object indicated by the winning bid response to request a third-party content item. The method further includes providing the instructions to the client device in response to the notification of the available impression.

In some implementations, at least one of the multiple different bidders is a demand side platform associated with a set of third-party content providers. In some implementations, the bid response received from the demand side platform includes a monetary value based on a maximum of multiple bid amounts associated with the set of third-party content providers.

In some implementations, the instructions cause the client device to request the third-party content item from a demand side platform associated with the winning bid response. In some implementations, the demand side platform delivers the third-party content item to the client device in response to the request.

In some implementations, the method further includes receiving a notification from the client device that the third-party content item has been received from a demand side platform separate from the real-time bidding system and billing the demand side platform from which the third-party content item has been received in response to a notification from the client device that the third-party content item has been presented.

In some implementations, the content requestor object indicated by the winning bid response is installed on the client device. In some implementations, the content requestor object indicated by the winning bid response is configured to request a third-party content item from a particular demand side platform.

In some implementations, the notification of the available impression includes a list of one or more content requestor objects installed on the client device and the content requestor object indicated by the winning bid response is selected from the list of content requestor objects installed on the client device. In some implementations, the method further includes providing the content requestor object indicated by the winning bid response to the client device in conjunction with the instructions.

In some implementations, the winning bid response includes one or more parameters for the indicated content requestor object. In some implementations, providing the instructions to the client device includes providing the parameters to the indicated content requestor object in conjunction with instructions to use the parameters to construct the request for the third-party content item.

In some implementations, each bid response includes a bid amount and selecting the winning bid response includes selecting a bid response based on the bid amounts.

In some implementations, the method further includes logging a delayed impression in response to identifying the winning bid response, receiving a notification from the client device that the third-party content item has been presented on the client device, and billing the bidder associated with the winning bid response in response to the notification that the third-party content item has been presented on the client device.

In some implementations, at least one of the instructions or the indicated content requestor object causes the client device to provide the bidder associated with the winning bid with impression-related information not included in the notification of the available impression for use in selecting the third-party content item.

Another implementation of the present disclosure is a system for providing third-party content to a client device using integrated objects. The system includes a computing system configured to receive a notification of an available impression for presenting third-party content on the client device from an impression notification object integrated with an application executing on the client device, to auction the available impression to multiple different bidders, and to receive a bid response from each of the multiple different bidders. Each bid response includes an indication of a content requestor object. The computing system is further configured to identify a winning bid response and a content requestor object indicated by the winning bid response and to generate instructions for the client device. The instructions cause the client device to use the content requestor object indicated by the winning bid response to request a third-party content item. The computing system is further configured to provide the instructions to the client device in response to the notification of the available impression.

In some implementations, at least one of the multiple different bidders is a demand side platform associated with a set of third-party content providers. In some implementations, the bid response received from the demand side platform includes a monetary value based on a maximum of multiple bid amounts associated with the set of third-party content providers.

In some implementations, the instructions cause the client device to request the third-party content item from a demand side platform associated with the winning bid response. In some implementations, the demand side platform delivers the third-party content item to the client device in response to the request.

In some implementations, the notification of the available impression includes a list of one or more content requestor objects installed on the client device and the content requestor object indicated by the winning bid response is selected from the list of content requestor objects installed on the client device.

In some implementations, the winning bid response includes one or more parameters for the indicated content requestor object. In some implementations, providing the instructions to the client device includes providing the parameters to the indicated content requestor object in conjunction with instructions to use the parameters to construct the request for the third-party content item.

In some implementations, the computing system is configured to log a delayed impression in response to identifying the winning bid response, receive a notification from the client device that the third-party content item has been presented on the client device, and bill the bidder associated with the winning bid response in response to the notification that the third-party content item has been presented on the client device.

In some implementations, at least one of the instructions or the content requestor object causes the client device to provide the bidder associated with the winning bid with impression-related information not included in the notification of the available impression. In some implementations, the bidder associated with the winning bid uses the impression-related information to select the third-party content item.

Another implementation of the present disclosure is a system for providing content to a client device. The system includes a real-time bidding system configured to receive a notification of an available impression from a client device and to auction the available impression to multiple different demand side platforms. The real-time bidding system is configured to receive a bid response from each of the demand side platforms and to identify a winning bid response and a content requestor object indicated by the winning bid response. The real-time bidding system is configured to instruct the client device to use the content requestor object indicated by the winning bid response to request a third-party content item from a demand side platform associated with the winning bid response.

In some implementations, each of the demand side platforms is associated with a different set of third-party content providers. In some implementations, a bid response from a demand side platform includes a monetary amount based on a maximum of multiple bid amounts from the set of third-party content providers associated with the demand side platform.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Figure 1:
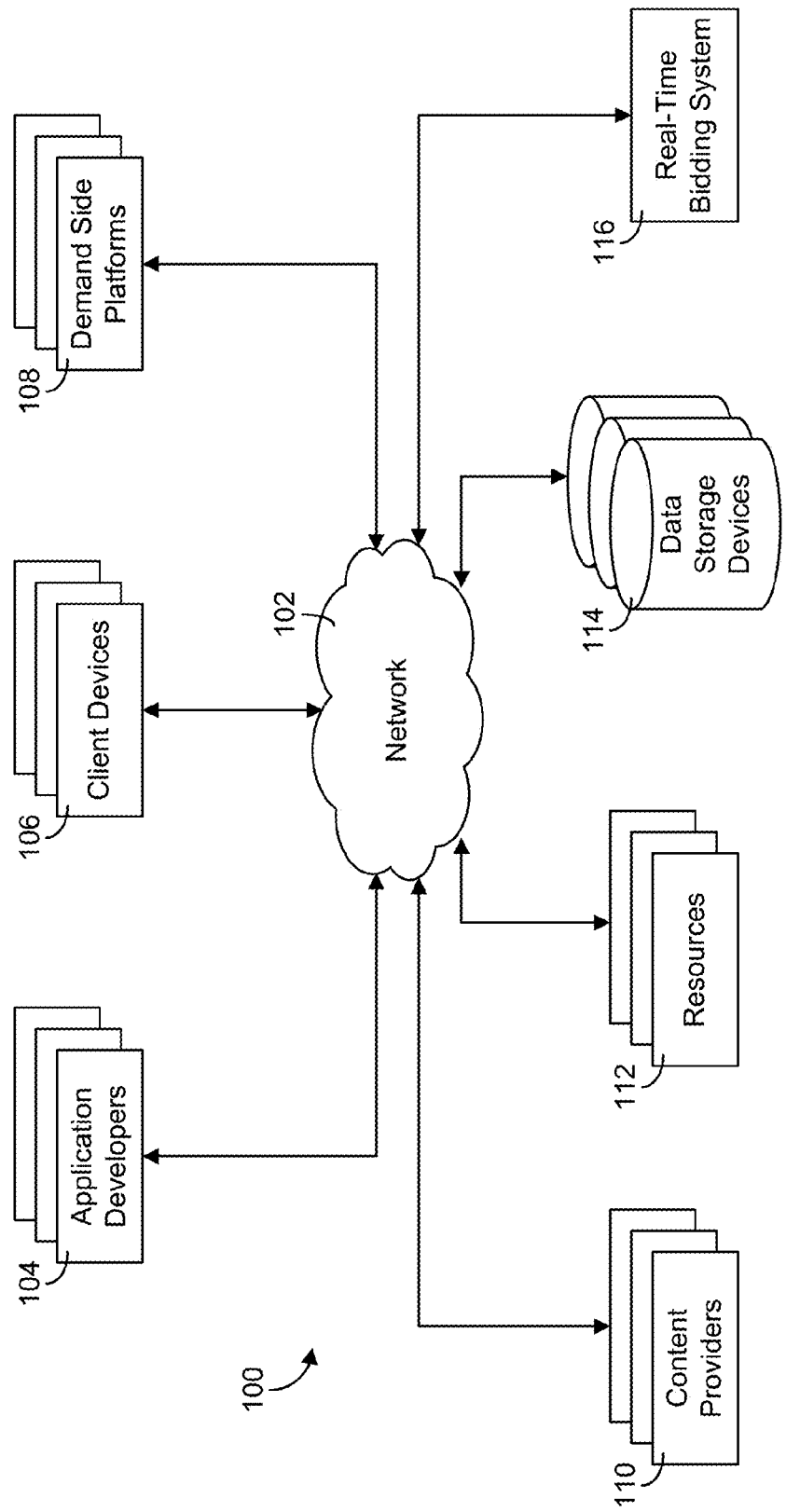
FIG. 1 is a block diagram of a computing system configured to perform a multistage process for providing third-party content to a client device using content requestor objects, the system including application developers, a real-time bidding system, demand side platforms, and client devices, according to a described implementation.

Referring generally to the FIGURES, a multistage method and system for providing content using content requestor objects are shown, according to a described implementation. The method and system described herein may be used to provide content to a client device using a multistage process. In brief overview, the multistage process includes a first stage in which an available impression is auctioned to multiple different bidders and the winning bidder submits a bid response that indicates a particular content requestor object. In response to the notification of the available impression, the client device is provided with instructions to use the indicated content requestor object to request a third-party content item. The multistage process further includes a second stage in which the client device executes the instructions and uses the indicated content requestor object to request a third-party content item.

In the first stage of the multistage process, an impression notification object integrated with an application executing on the client device notifies a real-time bidding (RTB) system of an available impression for presenting a third-party content item on the client device. In some implementations, a software development kit (SDK) is provided to an application developer and used by the application developer to generate the impression notification object. The impression notification object may include template code that can be integrated with the application developed for a client device. In some implementations, the notification of the available impression includes a list of content requestor objects installed on the client device. Each content requestor object may be associated with a different demand side platform (e.g., different content servers or vendors) and configured to request third-party content items from the associated demand side platform. In some implementations, each content requestor object is generated using a different SDK (e.g., a proprietary SDK provided by a demand side platform).

The RTB system auctions the available impression to multiple different bidders. The multiple different bidders may be associated with various demand side platforms. Each bidder may be associated with a different set of third-party content providers and/or third-party content items. The RTB system receives a bid response from each bidder. The bid response may include an indication of a particular content requestor object. The indicated content requestor object may be one of the content requestor objects installed on the client device or another content requestor object not installed on the client device. The RTB system identifies a winning bid response and a content requestor object indicated by the winning bid response.

The RTB system generates a set of instructions (e.g., computer-readable code) for the client device and provides the instructions to the client device in response to the notification of the available impression. The generated instructions may cause the client device to use the indicated content requestor object to request a third-party content item.

In the second stage of the multistage process, the client device executes the generated instructions and uses the indicated content requestor object to request a third-party content item. In some implementations, the third-party content item is requested from the bidder (e.g., the demand side platform) associated with the winning bid response.

By involving multiple different demand side platforms in the auction for the available impression, the systems and methods described herein provide an increased competitiveness of the auction relative to traditional systems. This increased competitiveness may result in higher bid prices relative to an auction conducted with only a single demand side platform. Instead of providing a third-party content item to the client device in response to the notification of the available impression, the systems and methods of the present disclosure provide the client device with instructions. The instructions cause the client device to submit a separate request for a third-party content item using a specific content requestor object (e.g., an object generated by a proprietary SDK).

Referring now to FIG. 1, a block diagram of a computing system 100 is shown, according to a described implementation. In brief overview, computing system 100 is shown to include a network 102, application developers 104, client devices 106, demand side platforms (DSPs) 108, content providers 110, resources 112, data storage devices 114, and a real-time bidding (RTB) system 116. Computing system 100 may facilitate communication between application developers 104, client devices 106, and RTB system 116. In various embodiments, DSPs 108 and/or RTB system 116 may provide application developers 104 with a SDK via network 102. The SDK may be used to generate an impression notification object that can be integrated with an application developed by application developers 104. Application developers 104 may create an application for client devices 106 and distribute the application to client devices 106 via network 102.

Computing system 100 may also facilitate communication between client devices 106, RTB system 116, DSPs 108, and content providers 110. Client devices 106 may notify RTB system 116 of an available impression for presenting third-party content on client devices 106. RTB system 116 may auction the available impression to DSPs 108. Each of DSPs 108 may be associated with a different set of content providers 110. DSPs 108 may submit bid responses to RTB system 116 via network 102. RTB system 116 may generate instructions for client devices 106 and deliver the instructions to client devices 106 via network 102. The instructions may cause client devices 106 to request a third-party content item from one of DSPs 108.

Still referring to FIG. 1, and in greater detail, computing system 100 is shown to include a network 102. Network 102 may be a local area network (LAN), a wide area network (WAN), a cellular network, a satellite network, a radio network, the Internet, or any other type of data network or combination thereof. Network 102 may include any number of computing devices (e.g., computers, servers, routers, network switches, etc.) configured to transmit, receive, or relay data. Network 102 may further include any number of hardwired and/or wireless connections. For example, application developers 104 may communicate wirelessly (e.g., via WiFi, cellular, radio, etc.) with a transceiver that is hardwired (e.g., via a fiber optic cable, a CAT5 cable, etc.) to a computing device of network 102.

Still referring to FIG. 1, computing system 100 is shown to include application developers 104. Application developers 104 may create an application for distribution to client devices 106. The application may be created by generating program code and compiling the program code into an executable application (e.g., computer-executable instructions) compatible with client devices 106. Application developers 104 may create any type of application including, for example, general productivity applications (e.g., word processing, email, banking, etc.), information retrieval applications (e.g., calendar, contacts, stocks, weather, etc.), entertainment applications (e.g., games, Internet browsing, etc.), location-based services applications (e.g., GPS, navigation, directions, etc.), and/or other types of applications that can be run by client devices 106. The applications may be configured to be compatible with a specific class of client devices 106 (e.g., tablet computers, desktop computers, smartphones, etc.), a specific operating system used by client devices 106, or any other criteria affecting the compatibility of the developed applications.

In some implementations, application developers 104 create mobile applications. A mobile application may be defined as a software application designed to run on a mobile device such as a smartphone, a tablet, a laptop, a PDA, and/or other types of mobile devices. In other words, application developers 104 may create applications which are specifically configured to be executed (e.g., launched, run, etc.) by mobile devices. In other implementations, application developers 104 create applications that can be run by other types of client devices 106 such as desktop computers, stationary workstations, or other types of non-mobile client devices. The applications may be configured to be compatible with mobile devices, non-mobile devices, or both mobile and non-mobile devices. In some implementations, the applications may be configured to be executed by a web server. The applications may be web-based applications presented via network 102 to client devices 106.

In some implementations, application developers 104 integrate an impression notification object with an application developed by application developers 104. The impression notification object may cause client devices 106 to notify RTB system 116 of an available impression for presenting a third-party content item on client devices 106 when the impression notification object is executed by client devices 106. The impression notification object may notify RTB system 116 of the available impression in response to an event detected by client devices 106 and/or an application running on client devices 106.

In some implementations, application developers 104 integrate one or more content requestor objects with an application developed by application developers 104. The content requestor objects may cause client devices 106 to request third-party content items from DSPs 108. A particular content requestor object may be triggered to request a third-party content item from DSPs 108 in response to client devices 106 receiving instructions from RTB system 116 to use the particular content requestor object to request a third-party content item. In some implementations, content requestor objects may be configured to request third-party content items, receive and reconfigure the content items, present the content items via a user interface element, and/or measure user interaction with presented content items (e.g., clicks, conversions, display time, etc.).

Application developers 104 may be provided with one or more SDKs to assist in configuring the developed applications to perform various functions such as automatically notifying RTB system 116 of available impressions and/or requesting third-party content items from DSPs 108. A SDK may provide application developers 104 with a convenient mechanism for adapting their applications to automatically request, receive, and display various content items via client devices 106. A SDK may be configured to create a software object (e.g., computer script, a programming object, multiple lines of computer-executable code, etc.) which can be inserted into the application's program code prior to compilation. When executed by client devices 106, the software objects may cause client devices 106 to perform various functions based on the types and sources of the SDKs used to generate the software objects.

In some implementations, application developers are provided with a SDK configured to generate the impression notification object and/or one or more SDKs configured to generate content requestor objects. In other implementations, application developers 104 generate the various software objects (e.g., the impression notification object, one or more the content requestor objects, etc.) and/or integrate the software objects with applications developed for client devices 106 without using a SDK.

In some implementations, application developers 104 create applications configured to report impression-related information to DSPs 108 and/or RTB system 116. Impression-related information may include various signals or metrics which can be used by RTB system 116 to auction the available impression (e.g., setting bids prices based on an estimated value of the available impression) or by DSPs 108 to select relevant content for client devices 106 (e.g., selecting a third-party content item based on user interests). Impression-related information may include a user identifier indicating a user to which the third-party content item will be presented, a device identifier indicating a device on which the third-party content item will be presented, user profile data (e.g., user interest data, web browsing data, etc.), event data indicating an event that triggered the notification of the available impression or the request for third-party content, installed applications or modules on client devices 106 (e.g., a list of installed content requestor objects) and/or other information (e.g., custom metrics or signals) that may be collected and reported by client devices 106. Other examples of impression-related information include quantitative descriptions of interactions between client devices 106 and distributed content items (e.g., number of impressions, number of clicks, number of conversions, an amount spent associated with each conversion, etc.) or other metrics describing the behavior or usage of a client device (e.g., device usage information, software configuration, user profile information, geographic location, installed applications, etc.).

For situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, a user may have control over how information is collected (e.g., by an application, by client devices 106, etc.) and used by RTB system 116 and/or DSPs 108.

Still referring to FIG. 1, computing system 100 is shown to include client devices 106. Client devices 106 may include any number and/or type of user-operable electronic devices. For example, client devices 106 may include desktop computers, laptop computers, smartphones, tablets, mobile communication devices, remote workstations, client terminals, entertainment consoles, or any other devices capable of interacting with the other components of computing system 100 (e.g., via a communications interface). For example, client devices 106 may be capable of receiving content/applications via network 102, executing an application created by application developers 104, and/or executing instructions provided by RTB system 116. Client devices 106 may include mobile devices or non-mobile devices.

In some implementations, client devices 106 include an application (e.g., a web browser, a resource renderer, etc.) for converting electronic content into a user-comprehensible format (e.g., visual, aural, graphical, etc.). Client devices 106 may include a user interface element (e.g., an electronic display, a speaker, a keyboard, a mouse, a microphone, a printer, etc.) for presenting content to a user, receiving user input, or facilitating user interaction with an application created by application developers 104. Client devices 106 may include a processor capable of executing applications created by application developers 104 and one or more memory devices capable of storing applications, content items, application data, and/or various types of software objects (e.g., impression notification objects, content requestor objects, etc.).

Client devices 106 may be configured to run applications developed by application developers 104. Running an application developed by application developers 104 may include executing an impression notification object that has been integrated or otherwise combined with the application (e.g., using a SDK provided to application developers 104). Client devices 106 may execute instructions provided by the impression notification object. The impression notification object may cause client devices to notify RTB system 116 of an available impression for presenting third-party content on client devices 106. In some implementations, client devices 106 report a list of content requestor objects installed on client devices 106 to RTB system 116 along with the notification of the available impression.

Client devices 106 may be configured to receive and execute instructions provided by RTB system 116. The instructions from RTB system 116 may cause client devices 106 to run a particular content requestor object. The content requestor object may be an object already installed on client devices 106 or an object received from RTB system 116 in conjunction with the instructions. Client devices 106 may run (e.g., process, execute, perform instructions provided by, etc.) the content requestor object to perform various operations in accordance with the instructions included therein.

The content requestor object may cause client devices 106 to request a third-party content item from DSPs 108.

In some implementations, client devices 106 are configured to collect and report impression-related information to RTB system 116 and/or DSPs 108. Impression-related information may include various signals or metrics related to the available impression. For example, impression-related information may include a user identifier (e.g., a profile ID, user interest categories, etc.) a content identifier (e.g., a content ID or signature element), a device identifier, a referring URL identifier, a timestamp, a location identifier, a triggering event identifier, or any other attributes describing the available impression. Types of impression-related information collected and reported by client devices 106 may be defined by a content requestor object executed by client devices 106. Different content requestor objects may cause client devices 106 to collect and report different impression-related information to DSPs 108. In some implementations, the impression-related information includes one or more custom signals or metrics defined by DSPs 108.

Client devices 106 may be configured to receive and render first-party content (e.g., web pages, documents, media, etc.) from resources 112. Client devices 106 may be configured to load one or more embedded tags or objects in conjunction with the first-party content from resources 112. Embedded tags or objects may include computer-readable instructions (e.g., software code, JavaScript®, ECMAScript®, etc.) associated with a content slot within which a third-party content item can be presented. The computer-readable instructions may cause client devices 106 to request a third-party content item from DSPs 108 when the instructions are executed by client devices 106.

In some implementations, client devices 106 are capable of detecting an interaction with a distributed content item. An interaction with a content item may include displaying the content item, hovering over the content item, clicking on the content item, viewing source information for the content item, or any other type of interaction between client devices 106 and a content item. Interaction with a content item does not require explicit action by a user with respect to a particular content item. In some implementations, an impression (e.g., displaying or presenting the content item) may qualify as an interaction. The criteria for defining which user actions (e.g., active or passive) qualify as an interaction may be determined on an individual basis (e.g., for each content item) by content providers 110 or by DSPs 108.

Still referring to FIG. 1, computing system 100 is shown to include demand side platforms (DSPs) 108. DSPs 108 may include one or more third-party content servers, content vendors, content distribution systems, advertising networks, ad exchanges, or other systems capable of providing a third-party content item to client devices 106 in response to a request for content from client devices 106. Each of DSPs 108 may be associated with a different set of content providers 110. In some implementations, DSPs 108 function as an intermediary between content providers 110 and RTB system 116. For example, RTB system 116 may auction an available impression to DSPs 108 and DSPs 108 may bid on the available impression based on bidding parameters provided to DSPs 108 by content providers 110. DSPs 108 may be configured to optimize bidding for content providers 110 based on content distribution parameters provided by content providers 110 (e.g., budget parameters, content selection parameters, etc.) and/or performance indicators relating to the available impression (e.g., click-through-rate, predicted click-through-rate, cost per action, etc.).

DSPs 108 represent bidders in the auction conducted by RTB system 116. Each of DSPs 108 submits a bid response to RTB system 116. The bid response may include a bid price and/or an indication of a particular content requestor object. Each of DSPs 108 may individually determine a bid price to include in a bid response based on bidding parameters provided by the set of content providers 110 with which the DSP is associated. For example, a first DSP may be associated with a first set of content providers (e.g., a first subset of content providers 110) and may submit a first bid response to RTB system 116 based on the maximum amount that the first set of content providers is willing to pay for the available impression. A second DSP may be associated with a second set of content providers (e.g., a second subset of content providers 110) and may submit a second bid response to RTB system 116 based on the maximum amount that the second set of content providers is willing to pay for the available impression.

RTB system 116 may select the winning bid response from the set of bid responses submitted by DSPs 108. RTB system 116 may provide the client device with instructions to use the content requestor object indicated by the winning bid response to request a third-party content item from the DSP associated with the winning bid response.

In some implementations, DSPs 108 provide application developers 104 with one or more content requestor objects that can be integrated with an application developed by application developers 104. In some implementations, DSPs 108 provide application developers with a SDK configured to generate a content requestor object. The content requestor objects may cause client devices 106 to request third-party content items from DSPs 108. A particular content requestor object may be triggered to request a third-party content item from DSPs 108 in response to client devices 106 receiving instructions from RTB system 116 to use the particular content requestor object to request a third-party content item. In some implementations, content requestor objects may be configured to request third-party content items, receive and reconfigure the content items, present the content items via a user interface element, and/or measure user interaction with presented content items (e.g., clicks, conversions, display time, etc.).

DSPs 108 may be configured to select a third-party content item for presentation on client devices 106 in response to a request for content from client devices 106. In some implementations, DSPs 108 select a third-party content item that is relevant to a particular context in which the third-party content item will be presented (e.g., based on the content of the application running on client devices 106, based on the content of a first-party resource in conjunction with which the third-party content item will be presented, etc.). DSPs 108 may select a third-party content item by comparing the keywords associated with the content item (e.g., specified by content providers 10, additional keywords extracted from the content item, etc.) with keywords associated with the application running on client devices 106 and/or with keywords associated with the first-party resource. In some implementations, DSPs 108 select a third-party content item that is relevant to a particular user identifier or client device to which the content item will be presented. DSPs 108 may compare the keywords associated with the content item with information (e.g., profile data, user preferences, etc.) relating to a particular client device 106 or user identifier associated with the available impression.

In some implementations, DSPs 108 are configured to calculate an estimated return on investment associated with the available impression (e.g., an established click-through-rate, a predicted click-through-rate, etc.). The estimated return on investment may be a general quality signal for the client device or application executing on the client device, a particular quality signal for the available impression, or an individualized quality signal for the available impression and a particular third-party content item. DSPs 108 may use the estimated return on investment to determine bids prices for each of content providers 110.

In some implementations, DSPs 108 select a third-party content item which has characteristics matching the characteristics of a content slot in which the content item will be presented. DSPs 108 may select a content item having a display size which fits in a destination content slot. DSPs 108 may resize a selected content item to fit a content slot or add additional visual content to the selected content item (e.g., padding, a border, etc.) based on the display size of the content item and the display size of the content slot. In some implementations, eligible content items include content items matching established user preferences for receiving individualized content; however, DSPs 108 may select a content item that does not match established user preferences if an insufficient number of preferred content items are available. DSPs 108 may deliver the selected third-party content item to client devices 108.

Still referring to FIG. 1, computing system 100 is shown to include content providers 110. Content providers 110 may include one or more electronic devices representing advertisers, resource operators, business owners, or other entities using the services provided by DSPs 108 and/or RTB system 116. In some implementations, content providers 110 are third-party content providers (e.g., advertisers, advertising agencies, etc.). Content providers 110 may produce third-party content items that can be selected by DSPs 108 and delivered to client devices 106. The third-party content items may be stored in one or more data storage devices local to content providers 110, within DSPs 108, or in data storage devices 114.

In some implementations, the content items may be advertisements. The advertisements may be display advertisements such as image advertisements, Flash® advertisements, video advertisements, text-based advertisements, or any combination thereof. In other implementations, the content items may include other types of content which serve various non-advertising purposes. The content items may be displayed in a content slot of an application developed by application developers 104 or a content slot of resources 112. Content providers 110 may generate banner advertisements, interstitial advertisements, or other types of third-party content than can be presented via client devices 106.

Content providers 110 may submit campaign parameters to DSPs 108 that are used to control the distribution of content items to client devices 106. The campaign parameters may include keywords associated with the content items, bids corresponding to the keywords, a content distribution budget, geographic limiters, or other criteria used by DSPs 108 to determine when a content item may be provided to client devices 106.

Content providers 110 may access DSPs 108 to monitor the performance of the content items distributed according to the established campaign parameters. For example, content providers 110 may access DSPs 108 to review one or more behavior metrics associated with a content item or set of content items. The behavior metrics may describe a behavior of client devices 106 (e.g., number of impressions, number of clicks, number of conversions, an amount spent, etc.) in response to a distributed content item. The behavior metrics may be reported to DSPs 108 by a content requestor object running on client devices 106.

Still referring to FIG. 1, computing system 100 is shown to include resources 112. Resources 112 may include any type of information or data structure that can be provided over network 102. In some implementations, resources 112 may be identified by a resource address associated with each resource (e.g., a uniform resource locator (URL)). Resources 112 may include web pages, word processing documents, portable document format (PDF) documents, images, video, programming elements, interactive content, streaming video/audio sources, or other types of electronic information. Resources 112 may include content (e.g., words, phrases, images, sounds, etc.) having embedded information (e.g., meta-information embedded in hyperlinks) and/or embedded instructions. Embedded instructions may include computer-readable instructions (e.g., software code, JavaScript®, ECMAScript®, etc.) which are executed by client devices 106 (e.g., by a web browser running on client devices 106).

In some implementations, resources 112 may report behavioral data including one or more behavior metrics to DSPs 108 and/or RTB system 116. Behavioral data generated by resources 112 may include website traffic data, conversion data (e.g., conversion type, amount spent, etc.), click-through-path data (e.g., content impressions, clicks, or other interactions responsible for a conversion event), resource visit/download data, user account-related data, content item data (e.g., impressions, clicks, conversions, etc.), content selection data (e.g., content slot information, number/type of content requests, delivered content items, etc.), resource data, landing page data, or other types of data describing interactions between resources 112 and one or more of content providers 110, client devices 106, and DSPs 108.

Still referring to FIG. 1, computing system 100 is shown to include data storage devices 114. Data storage devices 114 may be any type of memory device capable of storing application data, content items, impression-related information, user profile data, or other data used by RTB system 116 and/or DSPs 108. Data storage devices 114 may include any type of non-volatile memory, media, or memory devices. For example, data storage devices 114 may include semiconductor memory devices (e.g., EPROM, EEPROM, flash memory devices, etc.) magnetic disks (e.g., internal hard disks, removable disks, etc.), magneto-optical disks, and/or CD-ROM and DVD-ROM disks. In some implementations, data storage devices 114 may be local to DSPs 108, application developers 104, content providers 110, and/or RTB system 116. In other implementations, data storage devices 114 may be remote data storage devices connected with one or more components of computing system 100 via network 102.

Still referring to FIG. 1, computing system 100 is shown to include a real-time bidding (RTB) system 116. RTB system 116 may be configured to provide application developers 104 with an impression notification object that can be integrated with an application developed by application developers 104. In some implementations, RTB system 116 provides application developers 104 with a SDK configured to generate the impression notification object. The impression notification object may cause client devices 106 to notify RTB system 116 of an available impression for presenting a third-party content item on client devices 106 when executed by client devices 106.

RTB system 116 may be configured to receive a notification of an available impression from client devices 106 and to auction the available impression to DSPs 108. RTB system 116 may receive bid responses from DSPs 108. Each bid response may include a bid amount and/or an indication of a content requestor object. RTB system 116 may identify a winning bid response and a content requestor object indicated by the winning bid response.

RTB system 116 may generate instructions for client devices 106 based on a result of the auction. The instructions may cause client devices 106 to use the content requestor object indicated by the winning bid response to request a third-party content item. RTB system 116 may provide the instructions to client devices 106 in response to the notification of the available impression.

Figure 2:
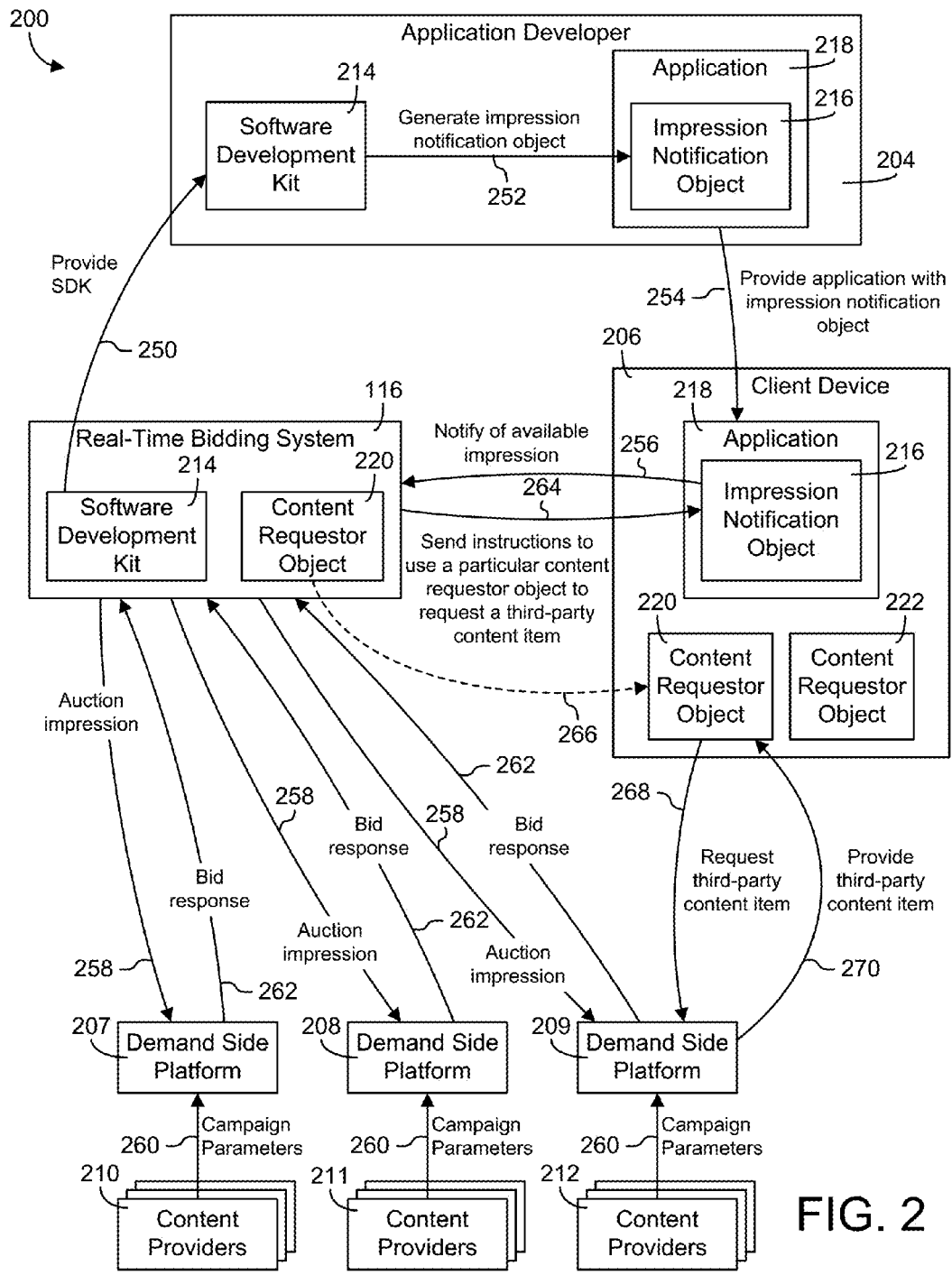
FIG. 2 is a flow diagram illustrating interactions between the application developers, real-time bidding system, demand side platforms, and client devices of FIG. 1, according to a described implementation.

Referring now to FIG. 2, a flow diagram 200 illustrating a process for providing content via software development kits is shown, according to a described implementation. Flow diagram 200 illustrates various interactions between an application developer 204, a client device 206, RTB system 116, demand side platforms (DSPs) 207-209, and content providers 210-212. Application developer 204 and client device 206 may each be one of application developers 104 and client devices 106, respectively, as described with reference to FIG. 1. Each of DSPs 207-209 may be one of DSPs 108, as described with reference to FIG. 1. Although only three DSPs 207-209 are shown in FIG. 2, any number of DSPs can be present in various implementations.

Each of DSPs 207-209 may be associated with a different set of content providers 210-212. As shown in FIG. 2, a first DSP 207 is associated with a first set of content providers 210, a second DSP 208 is associated with a second set of content providers 211, and a third DSP 209 is associated with a third set of content providers 212. Each set of content providers 210-212 may be a different subset of content providers 110, as described with reference to FIG. 1. The interactions between entities in FIG. 2 may be direct (e.g., directly from client device 206 to RTB system 116, directly from RTB system 116 to DSPs 207-209, etc.) or indirect (e.g., via network 102 or one or more intermediaries).

Still referring to FIG. 2, flow diagram 200 is shown to include RTB system 116 providing a software development kit (SDK) 214 to application developer 204 (stage 250). SDK 214 may be configured to generate an impression notification object 216 that can be integrated with an application 218 developed by application developer 104 (stage 252). SDK 214 may provide application developer 204 with a convenient mechanism for adapting application 218 to include impression notification object 216. In an alternative implementation, application developer 204 may generate impression notification object 216 and/or integrate impression notification object 216 with application 218 without using a SDK. Impression notification object 216 may include computer-executable instructions (e.g., a code snippet) which can be inserted into the program code of application 218 prior to compilation.

Application 218 and impression notification object 216 may be provided as an integrated package from application developer 204 to client device 206 (stage 254). Application 218 and impression notification object 216 may be stored in a memory device of client device 206 (e.g., non-volatile memory, hard disk memory, solid state memory, etc.). Client device 206 may include a processor, operating system, or other software or hardware configured to run application 218. Running application 218 may include running impression notification object 216.

Still referring to FIG. 2, flow diagram 200 is shown to include client device 206 notifying RTB system 116 of an available impression for presenting third-party content on client device 206 (stage 256). In some implementations, the notification of the available impression may include a list of content requestor objects installed on client device 206 (e.g., content requestor objects 220-222). In various implementations, content requestor objects 220-222 may be part of application 218, part of other applications installed on client device 206, or independent objects installed on client device 206. Content requestor objects 220-222 may be generated using other software development kits (e.g., proprietary SDKs provided by DSPs 207-209). In some implementations, each of content requestor objects 220-222 may be configured to request third-party content items from a different DSP (e.g., one of DSPs 207-207).

RTB system 116 may auction the available impression to multiple different bidders (stage 258). As shown in FIG. 2, the bidders may be DSPs 207-209. In other implementations, RTB system 116 may auction the available impression directly to a set of content providers (e.g., a set of content providers 210-212 or a different set of content providers 110) or to a combination of DSPs 207-209 and content providers. Bidders may include DSPs, sets of content providers, and/or individual content providers. In some implementations, RTB system 116 provides DSPs 207-209 with the list of content requestor objects installed on client device 206.

Still referring to FIG. 2, flow diagram 200 is shown to include content providers 210-212 submitting campaign parameters to DSPs 207-209 (stage 260). Campaign parameters may include content distribution parameters (e.g., keywords, geographic limiters, interest categories, etc.), budget parameters (e.g., a total content distribution budget for a defined time period), and/or bids parameters for various third-party content items or groups of third-party content items. Campaign parameters may be provided to DSPs 207-209 at any time (e.g., prior to RTB system 116 receiving the notification of the available impression).

RTB system 116 may receive bid responses from DSPs 207-209 (stage 262). As shown in FIG. 2, DSP 207 is associated with a first set of content providers 210 and may submit a first bid response to RTB system 116 based on the maximum amount that the first set of content providers 210 is willing to pay for the available impression. DSP 208 may be associated with a second set of content providers 211 and may submit a second bid response to RTB system 116 based on the maximum amount that the second set of content providers 211 is willing to pay for the available impression. DSP 209 may be associated with a third set of content providers 212 and may submit a second bid response to RTB system 116 based on the maximum amount that the third set of content providers 212 is willing to pay for the available impression. In some implementations, each bid response includes a bid amount (e.g., a monetary amount) and an indication of a content requestor object. The indicated content requestor object may be one of the content requestor objects installed on client device 206 or a different content requestor object (e.g., an object not currently installed on client device 206).

RTB system 116 may identify a winning bid response and a content requestor object indicated by the winning bid response. In some implementations, identifying a winning bid response includes selecting the bid response associated with the highest bid amount. RTB system 116 may generate instructions for client device 206. The instructions may cause client device 206 to use the content requestor object indicated by the winning bid response to request a third-party content item.

Still referring to FIG. 2, flow diagram 200 is shown to include RTB system 116 providing the instructions to client device 206 (stage 264). The instructions may be provided to client device 206 in response to the notification of the available impression. Client device 206 may execute the instructions and use the indicated content requestor object to request a third-party content item. In some implementations, RTB system 116 may provide the indicated content requestor object to client device 206 in conjunction with the instructions (stage 266). Stage 266 may be performed if the indicated content requestor object is not already installed on client device 206.

Flow diagram 200 is shown to include client device 206 requesting a third-party content item from DSP 209 (stage 268). Stage 268 may be performed in response to client device 206 executing the instructions provided by RTB system 116. The instructions may cause client device 206 to use a particular content requestor object to request a third-party content item from a particular DSP.

In some implementations, the indicated content requestor object may provide the corresponding DSP with additional information regarding the available impression (i.e., impression-related information). Impression-related information may include a user identifier (e.g., indicating a user to which the third-party content item will be presented), a device identifier (e.g., indicating a device on which the third-party content item will be presented), user profile data (e.g., user interest data, web browsing data, etc.), event data (e.g., indicating an event that triggered the notification of the available impression or the request for third-party content), installed applications or modules on client device 206 (e.g., a list of installed content requestor objects) and/or other information (e.g., custom metrics or signals) that may be collected and reported by client devices 206. In some implementations, the impression-related information includes supplemental information that was not included in the notification of the available impression in stage 256.

The DSP from which the third-party content item was requested (i.e., DSP 209 in FIG. 2) may select a third-party content item and provide the selected third-party content item to client device 206 (stage 270). The content requestor object that requested the third-party content item may be configured to receive the third-party content item, adjust the third-party content item (if necessary), render the third-party content item, and/or otherwise control presentation of the third-party content item on client device 206.

Using the process described in flow diagram 200, multiple different DSPs are involved in the auction for the available impression. Involving multiple different DSPs increases the competitiveness of the auction relative to traditional systems in which only one DSP is involved. This increased competitiveness may result in higher bid prices relative to an auction conducted with only a single DSP. Instead of providing a third-party content item to client device 206 in response to the notification of the available impression, RTB system 116 provides client device 206 with instructions. The instructions cause client device 206 to submit a separate request for a third-party content item using an indicated content requestor object (e.g., an object generated by a proprietary SDK). The indicated content requestor object handles the content request and presentation, thereby allowing DSPs to use custom signals, metrics, and/or presentation techniques.

Figure 3:
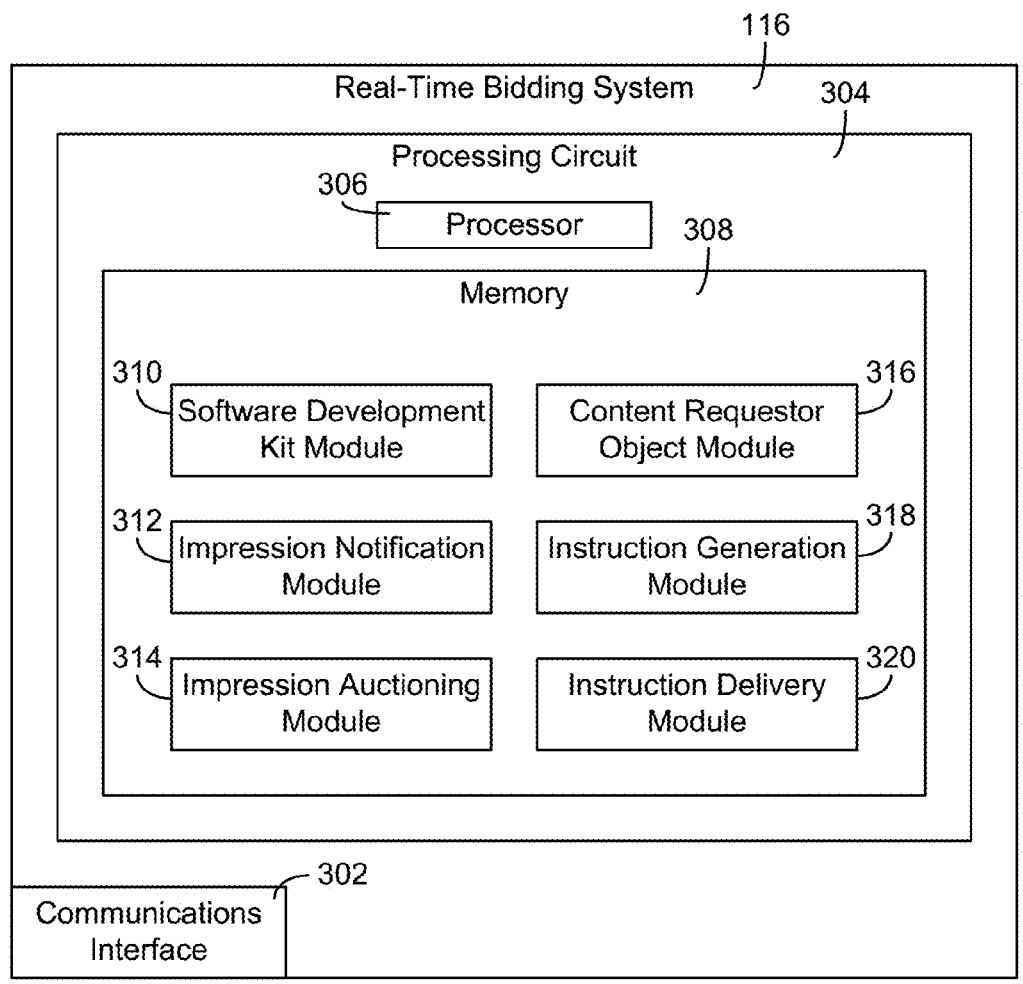
FIG. 3 is a block diagram illustrating the real-time bidding system of FIG. 1 in greater detail, according to a described implementation.

Referring now to FIG. 3, a block diagram illustrating RTB system 116 in greater detail is shown, according to a described implementation. RTB system 116 is shown to include a communications interface 302 and a processing circuit 304. Communications interface 302 may include wired or wireless interfaces (e.g., jacks, antennas, transmitters, receivers, transceivers, wire terminals, Ethernet ports, WiFi transceivers, etc.) for conducting data communications with local or remote devices or systems. For example, communications interface 302 may allow RTB system 116 to communicate with application developers 104, client devices 106, DSPs 108, and other components of computing system 100 (e.g., network 102, data storage devices 114, etc.).

Processing circuit 304 is shown to include a processor 306 and memory 308. Processor 306 may be implemented as a general purpose processor, an application specific integrated circuit (ASIC), one or more field programmable gate arrays (FPGAs), a CPU, a GPU, a group of processing components, or other suitable electronic processing components.

Memory 308 may include one or more devices (e.g., RAM, ROM, flash memory, hard disk storage, etc.) for storing data and/or computer code for completing and/or facilitating the various processes, layers, and modules described in the present disclosure. Memory 308 may include volatile memory or non-volatile memory. Memory 308 may include database components, object code components, script components, or any other type of information structure for supporting the various activities and information structures described in the present disclosure. In some implementations, memory 308 is communicably connected to processor 306 via processing circuit 304 and includes computer code (e.g., data modules stored in memory 308) for executing one or more processes described herein. In brief overview, memory 308 is shown to include a software development kit module 310, an impression notification module 312, an impression auctioning module 314, a content requestor object module 316, an instructions generation module 318, and an instructions delivery module 320.

Still referring to FIG. 3, memory 308 is shown to include a software development kit module 310. Software development kit (SDK) module 310 may be configured to provide application developers with a software development kit. The SDK provided by SDK module 310 may provide application developers 104 with a convenient mechanism for adapting their applications to include a software object generated by the SDK. For example, the SDK provided by SDK module 310 may be configured to create a software object (e.g., a Java object, a programming object, multiple lines of computer-executable code, etc.) which can be inserted into an application's program code prior to compilation.

The SDK provided by SDK module 310 may be configured to generate an impression notification object that can be integrated with an application developed by application developers 104. The impression notification object may cause client devices 106 to notify RTB system 116 of an available impression for presenting a third-party content item on client devices 106. The impression notification object may notify RTB system 116 of the available impression in response to an event detected by client devices 106 and/or an application running on client devices 106.

In some implementations, application developers 104 use the SDK provided by SDK module 310 to integrate the impression notification object with an application developed for client devices 106. In other implementations, application developers 104 generate the impression notification object and/or integrate the impression notification object with the application developed for client devices 106 without using a SDK. The application and integrated impression notification object may be provided to client devices 106 (e.g., installed on client devices 106) and run by client devices 106. Running the impression notification object may cause client devices 106 to notify RTB system 116 of an available impression for presenting third-party content on client devices 106.

Still referring to FIG. 3, memory 308 is shown to include an impression notification module 312. Impression notification module 312 may be configured to receive a notification of an available impression from client devices 106. The notification of the available impression may be received by impression notification module in response to client devices 106 running the impression notification object. In some implementations, the impression notification object may notify RTB system 116 of an available impression in response to an event detected by client devices 106 (e.g., loading a content slot in an application running on client devices 106, clicking a link, viewing first-party resource content, etc.). The impression notification object may be configured to detect events that trigger the notification of the available impression.

In some implementations, the notification of the available impression may include information relating to the available impression. Impression-related information may include a user identifier (e.g., indicating a user to which the third-party content item will be presented), a device identifier (e.g., indicating a device on which the third-party content item will be presented), user profile data (e.g., user interest data, web browsing data, etc.), event data (e.g., indicating an event that triggered the notification of the available impression), and/or other information (e.g., custom metrics or signals) that may be collected and reported by client devices 206.

In some implementations, the notification of the available impression includes a list of content requestor objects installed on the client device. Installed content requestor objects may be part of the application provided by application developers 104, other applications installed on the client device, or independent objects installed on the client device. Content requestor objects may be generated by DSPs 108 and/or application developers 104 (e.g., using proprietary SDKs provided by DSPs 108 or without using SDKs). Each content requestor object may be configured to request third-party content items from a different DSP.

Still referring to FIG. 3, memory 308 is shown to include an impression auctioning module 314. Impression auctioning module 314 may auction the available impression to multiple different bidders. The bidders may include DSPs 108, content providers 110, or a combination of DSPs 108 and content providers 110. In some implementations, impression auctioning module 314 provides the bidders with the list of content requestor objects installed on the client device.

Impression auctioning module 314 may receive bid responses from the multiple different bidders. In some implementations, each bid response includes a bid amount (e.g., a monetary amount) and an indication of a content requestor object. The indicated content requestor object may be one of the content requestor objects installed on the client device or a different content requestor object (e.g., an object not currently installed on the client device). In some implementations, one or more of the bid responses may include a parameter or macro that can be passed to the indicated content requestor object for use in constructing a request for a third-party content item using the indicated content requestor object.

Each of the multiple different bidders may be associated with a different set of content providers. The bid amount submitted by a bidder may be based on the maximum amount that the set of content providers associated with the bidder is willing to pay for the available impression. By involving multiple different bidders in the auction for the available impression, the auction is more competitive than the auction would be if only a single bidder (e.g., a single DSP or vendor) were involved.

Impression auctioning module 314 may be configured to identify a winning bid response and a content requestor object indicated by the winning bid response. In some implementations, impression auctioning module 314 may identify the bid response that includes the highest bid amount as the winning bid response. If no content requestor object is indicated in the winning bid response, impression auctioning module 314 may identify a default content requestor object. Impression auctioning module 314 may be configured to log a delayed impression (e.g., an impression that is billed once confirmation is received that the third-party content item has been rendered) upon selecting a winning bid response.

Still referring to FIG. 3, memory 308 is shown to include a content requestor object module 316. Content requestor object module 316 may be configured to determine whether the indicated content requestor object is installed on the client device from which the notification of the available impression was received. If the indicated content requestor object is not currently installed on the client device, content requestor object module 316 may provide the indicated content requestor object to the client device. The indicated content requestor object may be provided to the client device by embedding the indicated content requestor object into a content slot in which a third-party content item will be presented. In some implementations, content requestor object module 316 causes the client device to download the content requestor object from a third-party resource (e.g., a website, a FTP site, etc.) or database (e.g., data storage devices 114).

Still referring to FIG. 3, memory 308 is shown to include an instructions generation module 318. Instructions generation module 318 may be configured to generate instructions for the client device based on a result of the auction performed by impression auctioning module 314. In some implementations, instructions generation module 318 generates instructions that cause the client device to use the content requestor object indicated by the winning bid response to request a third-party content item. The instructions generated by instructions generation module 318 may be computer-readable instructions (e.g., a HTML snippet, JavaScript instructions, etc.) that can be executed by the client device. In some implementations, the instructions include a parameter or macro that can be passed to the indicated content requestor object for use in constructing a request for a third-party content item using the indicated content requestor object.

Still referring to FIG. 3, memory 308 is shown to include an instructions delivery module 320. Instructions delivery module 320 may be configured to provide the instructions generated by instructions generation module 318 to the client device. The instructions may be provided to the client device in response to the notification of the available impression. In some implementations, instructions delivery module 320 may provide the instructions to the client device by embedding the instructions in a content slot that triggered the notification of the available impression (e.g., a content slot in which the third-party content item will be displayed). Instructions delivery module 320 may provide the instructions to the client device such that the instructions can be executed by the client device.

In some implementations, instructions delivery module 320 delivers the instructions to the client device in conjunction with the indicated content requestor object. Instructions delivery module 320 may deliver the indicated content requestor object to the client device for implementations in which the indicated content requestor object is not already installed on the client device.

The client device executes the instructions provided by instructions delivery module 320 and performs one or more operations defined by the instructions. The instructions may cause the client device to use a particular content requestor object to request a third-party content item from a particular DSP.

In some implementations, the indicated content requestor object may provide the corresponding DSP with additional information regarding the available impression (i.e., impression-related information). Impression-related information may include a user identifier (e.g., indicating a user to which the third-party content item will be presented), a device identifier (e.g., indicating a device on which the third-party content item will be presented), user profile data (e.g., user interest data, web browsing data, etc.), event data (e.g., indicating an event that triggered the notification of the available impression or the request for third-party content), installed applications or modules on the client device (e.g., a list of installed content requestor objects) and/or other information (e.g., custom metrics or signals) that may be collected and reported by client devices 206. In some implementations, the impression-related information includes supplemental information that was not included in the notification of the available impression provided to impression notification module 312.

The DSP from which the third-party content item was requested may select a third-party content item and provide the selected third-party content item to the client device. The content requestor object that requested the third-party content item may be configured to receive the third-party content item, adjust the third-party content item (if necessary), render the third-party content item, and/or otherwise control presentation of the third-party content item on the client device.

Figure 4:
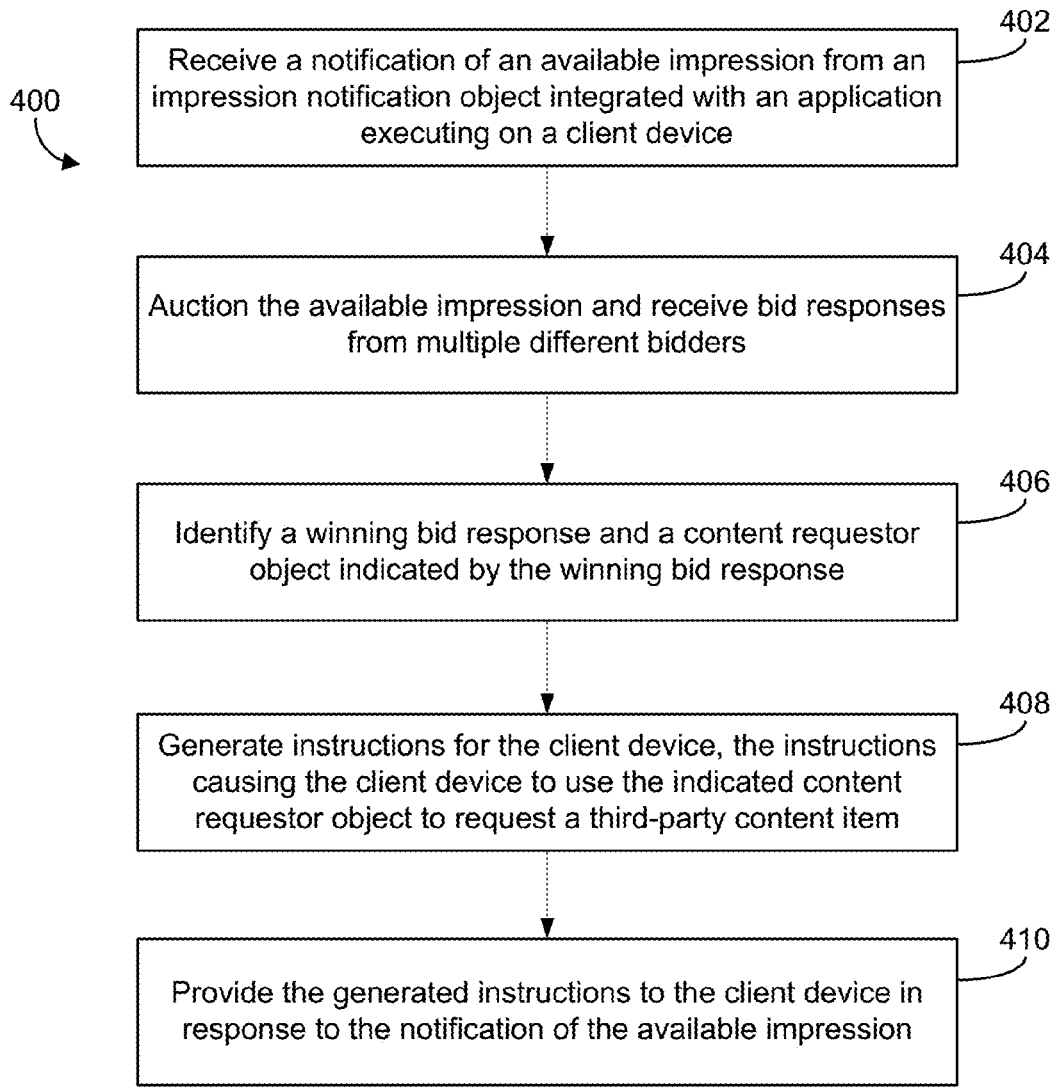
FIG. 4 is a flowchart of a multistage process for providing third-party content to a client device using content requestor objects, according to a described implementation.

Referring now to FIG. 4, a flowchart of a process 400 for providing content using content requestor objects is shown, according to a described implementation. In some implementations, process 400 may be performed by one or more modules of RTB system 116 as described with reference to FIGS. 1-3. In brief overview, process 400 is a multistage process that includes a first stage in which an available impression is auctioned to multiple different bidders and the winning bidder submits a bid response that indicates a particular content requestor object. In response to the notification of the available impression, the client device is provided with instructions to use the indicated content requestor object to request a third-party content item. Process 400 further includes a second stage in which the client device executes the instructions and uses the indicated content requestor object to request a third-party content item.

Still referring to FIG. 4, and in greater detail, process 400 is shown to include receiving a notification of an available impression from an impression notification object integrated with an application executing on a client device (stage 402). The notification of the available impression may be a notification of an opportunity for presenting third-party content on the client device. The notification of the available impression may be received in response to the client device executing the impression notification object. In some implementations, the impression notification object may notify RTB system 116 of an available impression in response to an event detected by client devices 106 (e.g., loading a content slot in an application running on the client device, clicking a link, viewing first-party resource content, etc.). The impression notification object may be configured detect events that trigger the notification of the available impression.

In some implementations, the impression notification object is integrated with the application executing on the client device using a software development kit (SDK). The SDK may provide the application developer with a convenient mechanism for adapting the application for the client device to include a software object generated by the SDK. For example, the SDK may be configured to create a software object (e.g., a Java object, a programming object, multiple lines of computer-executable code, etc.) which can be inserted into an application's program code prior to compilation. The SDK may be configured to generate an impression notification object that can be integrated with an application developed by the application developer. The application and integrated impression notification object may be provided to the client device (e.g., installed on the client device) and executed by the client device. In other implementations, the impression notification object is integrated with the application executing on the client device without using a SDK.

In some implementations, the notification of the available impression may include information relating to the available impression. Impression-related information may include a user identifier (e.g., indicating a user to which the third-party content item will be presented), a device identifier (e.g., indicating a device on which the third-party content item will be presented), user profile data (e.g., user interest data, web browsing data, etc.), event data (e.g., indicating an event that triggered the notification of the available impression), and/or other information (e.g., custom metrics or signals) that may be collected and reported by the client device.

In some implementations, the notification of the available impression includes a list of content requestor objects installed on the client device. Installed content requestor objects may be part of the application developed by the application developer, other applications installed on the client device, or independent objects installed on the client device. Content requestor objects may be generated using other software development kits (e.g., proprietary SDKs provided by DSPs 108) or without using SDKs. Each content requestor object may be configured to request third-party content items from a different DSP.

Still referring to FIG. 4, process 400 is shown to include auctioning the available impression and receiving bid responses from multiple different bidders (stage 404). The bidders may include DSPs, content providers, or a combination of DSPs and content providers. In some implementations, stage 404 includes providing the bidders with the list of content requestor objects installed on the client device or other information related to the available impression (e.g., impression-related information as described with reference to stage 402).

Each bid response may include an indication of a content requestor object and/or a bid amount (e.g., a monetary amount). An indication of a content requestor object may be a HTML snippet, a text string, or other indication of a particular content requestor object. In some implementations, a content requestor object may be indicated by the name of a SDK used to generate the content requestor object. The indicated content requestor object may be one of the content requestor objects installed on the client device or a different content requestor object (e.g., an object not currently installed on the client device). In some implementations, one or more of the bid responses may include a parameter or macro that can be passed to the indicated content requestor object for use in constructing a request for a third-party content item using the indicated content requestor object.

Each of the multiple different bidders may be associated with a different set of content providers. The bid amount submitted by a bidder may be based on the maximum amount that the set of content providers associated with the bidder is willing to pay for the available impression. By involving multiple different bidders in the auction for the available impression, the auction is more competitive than the auction would be if only a single bidder (e.g., a single DSP or vendor) were involved.

Still referring to FIG. 4, process 400 is shown to include identifying a winning bid response and a content requestor object indicated by the winning bid response (stage 406). In some implementations, stage 406 includes identifying the bid response that includes the highest bid amount as the winning bid response. The content requestor object may be indicated explicitly in the winning bid response (e.g., by a HTML snippet or text string identifying a content requestor object and/or a SDK used to generate a content requestor object) or implicitly (e.g., by the identity of the winning bidder). In some implementations, identifying a content requestor object includes identifying a bidder associated with the winning bid response and accessing a database to identify a content requestor object associated with the winning bidder. If no content requestor object is indicated in the winning bid response, stage 406 may include identifying a default content requestor object (e.g., a content requestor object provided by RTB system 116).

In some implementations, stage 406 includes determining whether the indicated content requestor object is installed on the client device. If the indicated content requestor object is not currently installed on the client device, stage 406 may include providing the indicated content requestor object to the client device. The indicated content requestor object may be provided to the client device by embedding the indicated content requestor object into a content slot in which a third-party content item will be presented. In various implementations, stage 406 may include providing the indicated requestor object to the client device from RTB system 116 or causing the client device to download the content requestor object from a third-party resource (e.g., a website, a FTP site, etc.) or database (e.g., data storage devices 114).

Stage 406 may include logging a delayed impression upon selecting a winning bid response. A delayed impression may be an impression that has not yet occurred. The delayed impression may not be completed until a third-party content item is received and presented by the client device. The client device may notify RTB system 116 that an impression has occurred when the content item is rendered by the client device, thereby completing the delayed impression.

Still referring to FIG. 4, process 400 is shown to include generating instructions for the client device (stage 408).

Stage 408 may include generating instructions for the client device based on a result of the auction performed in stage 404. In some implementations, stage 408 includes generating instructions that cause the client device to use the content requestor object indicated by the winning bid response to request a third-party content item. The instructions generated in stage 408 may be computer-readable instructions (e.g., a HTML snippet, JavaScript instructions, etc.) that can be executed by the client device. In some implementations, the instructions include a parameter or macro that can be passed to the indicated content requestor object for use in constructing a request for a third-party content item using the indicated content requestor object.

Still referring to FIG. 4, process 400 is shown to include providing the generated instructions to the client device in response to the notification of the available impression (stage 410). In some implementations, stage 410 includes embedding the instructions in a content slot that triggered the notification of the available impression (e.g., a content slot in which the third-party content item will be displayed). The instructions may be provided to the client device in an executable format (e.g., a HTML snippet, computer-readable code, etc.) such that the instructions can be executed by the client device.

The client device executes the instructions provided in stage 410 and performs one or more operations defined by the instructions. The instructions may cause the client device to use a particular content requestor object to request a third-party content item from a particular DSP. Each content requestor object installed on the client device may be configured to request a third-party content item from a particular DSP. In some implementations, stage 410 includes delivering the instructions to the client device in conjunction with the indicated content requestor object (e.g., for implementations in which the indicated content requestor object is not already installed on the client device).

In some implementations, the indicated content requestor object may provide the corresponding DSP with additional information regarding the available impression (i.e., impression-related information as described with reference to stage 402). The impression-related information provided to the DSP by the indicated content requestor object may include supplemental information that was not included in the notification of the available impression in stage 402. For example, the impression-related information provided to the indicated DSP may include custom signals or metrics that are collected and/or reported by the indicated content requestor object. In some implementations, the impression-related information provided to the DSP may be based on the instructions provided to the content requestor object. For example, the instructions may identify or define one or more signals or metrics to be collected and/or reported to the DSP in conjunction with the request for the third-party content item.

The DSP from which the third-party content item is requested may select a third-party content item from a set of content items and/or content providers associated with the DSP and provide the selected third-party content item to the client device. The content requestor object on the client device may be configured to receive the third-party content item, adjust the third-party content item (if necessary), render the third-party content item, and/or otherwise control presentation of the third-party content item on the client device.

Using the systems and methods of the present disclosure, multiple different DSPs are involved in the auction for the available impression. Involving multiple different DSPs increases the competitiveness of the auction relative to traditional systems in which only one DSP is involved. This increased competitiveness may result in higher bid prices relative to an auction conducted with only a single DSP. Instead of providing a third-party content item to the client device in response to the notification of the available impression, RTB system 116 provides the client device with instructions. The instructions cause the client device to submit a separate request for a third-party content item using a particular content requestor object indicated in the instructions (e.g., an object generated by a proprietary SDK). The indicated content requestor object handles the content request and presentation, thereby allowing DSPs to use custom signals, metrics, and/or presentation techniques.

Implementations of the subject matter and the operations described in this specification may be implemented in digital electronic circuitry, or in computer software, firmware, or hardware, including the structures disclosed in this specification and their structural equivalents, or in combinations of one or more of them. Implementations of the subject matter described in this specification may be implemented as one or more computer programs, i.e., one or more modules of computer program instructions, encoded on one or more computer storage medium for execution by, or to control the operation of, data processing apparatus. Alternatively or in addition, the program instructions may be encoded on an artificially generated propagated signal (e.g., a machine-generated electrical, optical, or electromagnetic signal) that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially generated propagated signal. The computer storage medium may also be, or be included in, one or more separate components or media (e.g., multiple CDs, disks, or other storage devices). Accordingly, the computer storage medium is both tangible and non-transitory.

The operations described in this disclosure may be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

While this specification contains many specific implementation details, these should not be construed as limitations on the scope of any disclosures or of what may be claimed, but rather as descriptions of features specific to particular implementations of particular disclosures. Certain features that are described in this disclosure in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products embodied on one or more tangible media.

The features disclosed herein may be implemented on a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

Thus, particular implementations of the subject matter have been described. Other implementations are within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The construction and arrangement of the systems and methods as shown in the various illustrated implementations are examples only. Although only a few implementations have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method stages may be varied or re-sequenced according to alternative implementations. Other substitutions, modifications, changes, and omissions may be made in the design, operating conditions and arrangement of the illustrative implementations without departing from the scope of the present disclosure.

The present disclosure contemplates methods, systems and program products on any machine-readable media for accomplishing various operations. The implementations of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method stages, the order of the stages may differ from what is depicted. Also two or more stages may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection stages, processing stages, comparison stages and decision stages.

What is claimed is:

1. A method for providing third-party content to a client device using integrated objects, the method comprising:
    receiving, at a real-time bidding system from an impression notification object executing on a client device, a notification of an available impression for presenting third-party content in a content item slot of an application executing on the client device, the impression notification object comprising a code snippet inserted into the program code for the application;
    auctioning the available impression to a plurality of third-party content servers and receiving a bid response from each of the plurality of third-party content servers, each bid response comprising an indication of a content requestor object that is installed on the client device, corresponding to a respective one of the plurality of third-party content servers, and is configured to request a third-party content item from the respective one of the plurality of third-party content servers, each of the plurality of third-party content servers operating independently of the real-time bidding system;
    identifying a winning bid response and the content requestor object indicated by the winning bid response;
    generating instructions for execution by the client device, the instructions causing the client device to execute the content requestor object indicated by the winning bid response to transmit a separate request for a third-party content item from a corresponding third-party content server to be displayed in the content slot of the application executing on the client device; and
    providing the generated instructions to the client device in response to the notification of the available impression.

2. The method of claim 1, wherein at least one of the plurality of third-party content servers is a demand side platform associated with a plurality of third-party content providers;
    wherein the bid response received from the demand side platform comprises a monetary value based on a maximum of multiple bid amounts associated with the plurality of third-party content providers.

3. The method of claim 1, wherein the instructions cause the client device to generate the separate request for the third-party content item from a demand side platform of one of the plurality of third-party content servers associated with the winning bid response;
    wherein the demand side platform delivers the third-party content item to the client device in response to the generated separate request.

4. The method of claim 1, further comprising:
    receiving a notification from the client device responsive to receiving the third-party content item from a demand side platform of one of the plurality of third-party content servers separate from the real-time bidding system; and
    billing the demand side platform of one of the plurality of third-party content servers responsive to a notification received from the client device that the third-party content item has been presented.

5. The method of claim 1, wherein the notification of the available impression includes a list of one or more content requestor objects installed on the client device;
    wherein the content requestor object indicated by the winning bid response is selected from the list of one or more content requestor objects installed on the client device.

6. The method of claim 1, wherein the winning bid response comprises one or more parameters for the indicated content requestor object of the winning bid response;
    wherein providing the generated instructions to the client device comprises passing, from the real-time bidding system, the one or more parameters to the indicated content requestor object executing on the client device in conjunction with instructions to use the one or more parameters to construct the separate request for the third-party content item.

7. The method of claim 1, wherein each bid response comprises a bid amount;
    wherein selecting the winning bid response comprises selecting a bid response based on the bid amount of each bid response.

8. The method of claim 1, further comprising:
    logging a delayed impression in response to identifying the winning bid response;
    receiving a notification from the client device that the third-party content item has been presented on the client device; and
    billing the corresponding third-party content server associated with the winning bid response in response to the notification that the third-party content item has been presented on the client device.

9. The method of claim 1, wherein the content requestor object executing on the client device causes the client device to provide the corresponding third-party content server associated with the winning bid with impression-related information with the separate request.

10. A system for providing third-party content to a client device using integrated objects, the system comprising:
    a computing system comprising one or more computer-readable storage media and one or more processors, wherein the computing system is configured to:
        receive, from an impression notification object executing on a client device, a notification of an available impression for presenting third-party content in a content item slot of an application executing on the client device, the impression notification object comprising a code snippet inserted into the program code for the application;
        auction the available impression to a plurality of third-party content servers and receive a bid response from each of the plurality of third-party content servers, each bid response comprising an indication of a content requestor object that is installed on the client device, corresponding to a respective one of the plurality of third-party content servers, and is configured to request a third-party content item from the respective one of the plurality of third-party content server, each of the plurality of third-party content servers operating independent of the real-time bidding system;

identify a winning bid response and a content requestor object indicated by the winning bid response;

generate instructions for execution by the client device, the instructions causing the client device to execute the content requestor object indicated by the winning bid response to transmit a separate request for a third-party content item from a corresponding third-party content server to be displayed in the content slot of the application executing on the client device; and provide the generated instructions to the client device in response to the notification of the available impression.

11. The system of claim 10, wherein at least one of the plurality of third-party content servers is a demand side platform associated with a plurality of third-party content providers;

wherein the bid response received from the demand side platform comprises a monetary value based on a maximum of multiple bid amounts associated with the plurality of third-party content providers.

12. The system of claim 10, wherein the instructions cause the client device to generate the separate request for the third-party content item from a demand side platform of one of the plurality of third-party content servers associated with the winning bid response;

wherein the demand side platform delivers the third-party content item to the client device in response to the generated separate request.

13. The system of claim 10, wherein the notification of the available impression includes a list of one or more content requestor objects installed on the client device;

wherein the content requestor object indicated by the winning bid response is selected from the list of one or more content requestor objects installed on the client device.

14. The system of claim 10, wherein the winning bid response comprises one or more parameters for the indicated content requestor object of the winning bid response;

wherein providing the generated instructions to the client device comprises passing, from the real-time bidding system, the one or more parameters to the indicated content requestor object executing on the client device in conjunction with instructions to use the one or more parameters to construct the separate request for the third-party content item.

15. The system of claim 10, wherein the computing system is configured to:

log a delayed impression in response to identifying the winning bid response;

receive a notification from the client device that the third-party content item has been presented on the client device; and bill the corresponding third-party content server associated with the winning bid response in response to the notification that the third-party content item has been presented on the client device.

16. The system of claim 10, wherein the content requestor object executing on the client device causes the client device to provide the corresponding third-party content server associated with the separate request.

17. One or more computer-readable storage media storing instructions that, when executed by one or more processors, cause the one or more processors to perform the operations comprising:

transmitting a software development kit to an application developer, the software development kit generating an impression notification object integrated into the code for an application developed by the application developer;

receiving, from the impression notification object executing on a client device, a notification of an available impression in a content item slot of an application executing on the client device, the impression notification object comprising a code snippet inserted into the program code for the application;

receiving a first bid response from a first demand side platform of a first third-party content server and a second bid response from a second demand side platform of a second third-party content server, the first bid response comprising an indication corresponding to a first content requestor object that is installed on the client device, corresponding to the first demand side platform of the first third-party content server, and is configured to request a third-party content item from the first third-party content server, the second bid response comprising an indication corresponding to a second content requestor object that is installed on the client device, corresponding to the second demand side platform of the second third-party content server, and is configured to request a third-party content item from the second third-party content server;

selecting the first bid response based on an auction;

generating, responsive to selecting the first bid response, instructions for execution by the client device to cause the client device to execute the first content requestor object and transmit a separate request for a third-party content item from the first third-party content server to be displayed in the content slot of the application executing on the client device transmitting the generated instructions to the client device to transmit the separate request for a third-party content item from the first third-party content server.

18. The system of claim 17, wherein the first demand side platform is associated with a plurality of third-party content providers;

wherein a bid response from the first demand side platform comprises a monetary amount based on a maximum of multiple bid amounts from the plurality of third-party content providers associated with the first demand side platform.

* * * * *